US 011026133B2

(12) United States Patent
Vesterinen et al.

(10) Patent No.: US 11,026,133 B2
(45) Date of Patent: Jun. 1, 2021

(54) FLEXIBLE QUALITY OF SERVICE FOR INTER-BASE STATION HANDOVERS WITHIN WIRELESS NETWORK

(71) Applicant: NOKIA SOLUTIONS AND NETWORKS OY, Espoo (FI)

(72) Inventors: Seppo Ilmari Vesterinen, Kuopio (FI); Matti Einari Laitila, Oulu (FI); Kaisu Iisakkila, Espoo (FI); Devaki Chandramouli, Plano, TX (US); Cinzia Sartori, Pullach (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/568,433

(22) PCT Filed: Apr. 24, 2015

(86) PCT No.: PCT/US2015/027513
§ 371 (c)(1),
(2) Date: Oct. 23, 2017

(87) PCT Pub. No.: WO2016/171716
PCT Pub. Date: Oct. 27, 2016

(65) Prior Publication Data
US 2018/0115927 A1    Apr. 26, 2018

(51) Int. Cl.
*H04W 36/00* (2009.01)
*H04W 92/20* (2009.01)

(52) U.S. Cl.
CPC ... *H04W 36/0055* (2013.01); *H04W 36/0072* (2013.01); *H04W 36/0044* (2013.01); *H04W 92/20* (2013.01)

(58) Field of Classification Search
CPC ......... H04W 36/0055; H04W 36/0072; H04W 36/0044; H04W 92/20
See application file for complete search history.

(56) References Cited

U.S. PATENT DOCUMENTS 8,792,876 B1 * 7/2014 Zhu ..................... H04L 12/4641
370/338
2004/0203831 A1 * 10/2004 Khan .................... H04W 28/18
455/452.2

(Continued)

FOREIGN PATENT DOCUMENTS

EP   2079250 A1   7/2009
WO  2014040245 A1  3/2014

OTHER PUBLICATIONS

3GPP TR 23.705 V13.0.0 (Jan. 2014); 3rd Generation Partnership Project; Technical Specification Group Services and System Aspects; Study on system enhancements for user plane congestion management (Release 13); 61 pages.

(Continued)

*Primary Examiner* — Jeffrey M Rutkowski
*Assistant Examiner* — Jasper Kwoh
(74) *Attorney, Agent, or Firm* — Brake Hughes Bellermann LLP

(57) ABSTRACT

Improving user experience during handover. Transmitting by a source base station to a target base station a handover request message including a range of QoS profiles, receiving by the source bases station from the target base station a handover request acknowledge message indicating the radio resources or QoS profile selected from the range of QoS profiles, transmitting by the source base station station an identified resource gap between the selected QoS profile of the target base station and the currently used QoS profile in the source base station to an experience management entity.

16 Claims, 5 Drawing Sheets

(56) References Cited

U.S. PATENT DOCUMENTS

| | | | |
|---|---|---|---|
| 2005/0101328 A1* | 5/2005 | Son | H04W 36/26 455/436 |
| 2006/0281461 A1* | 12/2006 | Kwun | H04W 28/18 455/436 |
| 2009/0040983 A1* | 2/2009 | Kim | H04W 28/24 370/331 |
| 2009/0239570 A1* | 9/2009 | Koyanagi | H04W 36/0077 455/525 |
| 2010/0046477 A1* | 2/2010 | Marin | H04W 36/0072 370/332 |
| 2010/0272067 A1* | 10/2010 | Lu | H04W 36/0072 370/331 |
| 2011/0090871 A1* | 4/2011 | Kim | H04W 36/0044 370/332 |
| 2011/0310851 A1* | 12/2011 | Klingenbrunn | H04L 47/2491 370/332 |
| 2012/0051327 A1 | 3/2012 | Persson et al. | |
| 2012/0253847 A1* | 10/2012 | Dell'Anno | A61B 5/0022 705/3 |
| 2013/0128790 A1* | 5/2013 | Futaki | H04W 36/0055 370/311 |
| 2014/0023045 A1 | 1/2014 | Li et al. | |
| 2016/0066240 A1* | 3/2016 | Suzuki | H04W 36/08 370/331 |

OTHER PUBLICATIONS

3GPP TS 36.314 V12.0.0 (Sep. 2014); 3rd Generation Partnership Project; Technical Specification Group Radio Access Network; Evolved Universal Terrestrial Radio Access (E-UTRA); Layer 2—Measurements (Release 12), 20 pages.

3GPP TS 36.300 V12.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Stage 2 (Release 12), 251 pages.

3GPP TS 23.401 V13.2.0; 3rd Generation Partnership Project; Technical Specification Group Services and System Aspects; General Packet Radio Service (GPRS) enhancements for Evolved Universal Terrestrial Radio Access Network (E-UTRAN) access (Release 13), 356 pages.

3GPP TSG-RAN WG3 Meeting #82, San Francisco, USA, Nov. 11-15, 2013, R3-132102, "Handover procedure in case of bearer served by MeNB and SeNB (3C)", 8 pages.

PCT/US2015/027513 , "International Search Report and Written Opinion Received", dated Jan. 26, 2016, 10 pages.

International Preliminary Report on Patentability for International Application PCT/US2015/027513, dated Nov. 2, 2017, 11 pages.

* cited by examiner

FLEXIBLE QUALITY OF SERVICE FOR INTER-BASE STATION HANDOVERS WITHIN WIRELESS NETWORK

CROSS-REFERENCE TO RELATED APPLICATIONS

This application is a national stage entry of PCT Application No. PCT/US2015/027513 filed Apr. 24, 2015, entitled "FLEXIBLE QUALITY OF SERVICE FOR INTER-BASE STATION HANDOVERS WITHIN WIRELESS NETWORK" which is hereby incorporated by reference in its entirety.

TECHNICAL FIELD

This description relates to wireless networking.

BACKGROUND

Different user devices may have different quality of service (QoS) and/or quality of experience (QoE) requirements, such as bandwidth, data rate or latency. In some cases, a cell may be unable to meet the QoE or QoS requirements for a user device, depending on cell congestion or cell loading.

SUMMARY

According to an example embodiment, a method may include receiving, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; determining, by the target base station, a radio resource availability status of the target base station/target cell; and selecting, autonomously by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to an example implementation, an apparatus may include means for receiving, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; means for determining, by the target base station, a radio resource availability status of the target base station/target cell; and means for selecting, autonomously by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to another example implementation, an apparatus may include at least one processor and at least one memory including a computer program code, wherein the at least one memory and the computer program code are configured to, with the at least one processor, cause the apparatus at least to: receive, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; determine, by the target base station, a radio resource availability status of the target base station/target cell; and select, autonomously by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to another example implementation, a computer program product includes a computer-readable storage medium and storing executable code that, when executed by at least one data processing apparatus, is configured to cause the at least one data processing apparatus to perform a method including: receiving, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; determining, by the target base station, a radio resource availability status of the target base station/target cell; and selecting, autonomously by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to another example implementation, a method may include sending, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and receiving, by the source base station from the target base station, an indication of a selected QoS policy profile to be used by the target base station for providing a service quality to the user device after a handover of the user device is performed from the source base station to the target base station.

According to an example implementation, an apparatus may include means for sending, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and means for receiving, by the source base station from the target base station, an indication of a selected QoS policy profile to be used by the target base station for providing a service quality to the user device after a handover of the user device is performed from the source base station to the target base station.

According to another example implementation, an apparatus may include at least one processor and at least one memory including a computer program code, wherein the at least one memory and the computer program code are configured to, with the at least one processor, cause the apparatus at least to: send, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and receive, by the source base station from the target base station, an indication of a selected QoS policy profile to be used by the target base station for providing a service quality to the user device after a handover of the user device is performed from the source base station to the target base station.

According to another example implementation, a computer program product includes a computer-readable storage medium and storing executable code that, when executed by at least one data processing apparatus, is configured to cause the at least one data processing apparatus to perform a method including: sending, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and receiving, by the source base station from the target base station, an indication of a selected QoS policy profile to be used by the target base station for providing a service quality to the user device after a handover of the user device is performed from the source base station to the target base station.

The details of one or more implementations are set forth in the accompanying drawings and the description below. Other features will be apparent from the description and drawings, and from the claims.

DETAILED DESCRIPTION

Figure 1:
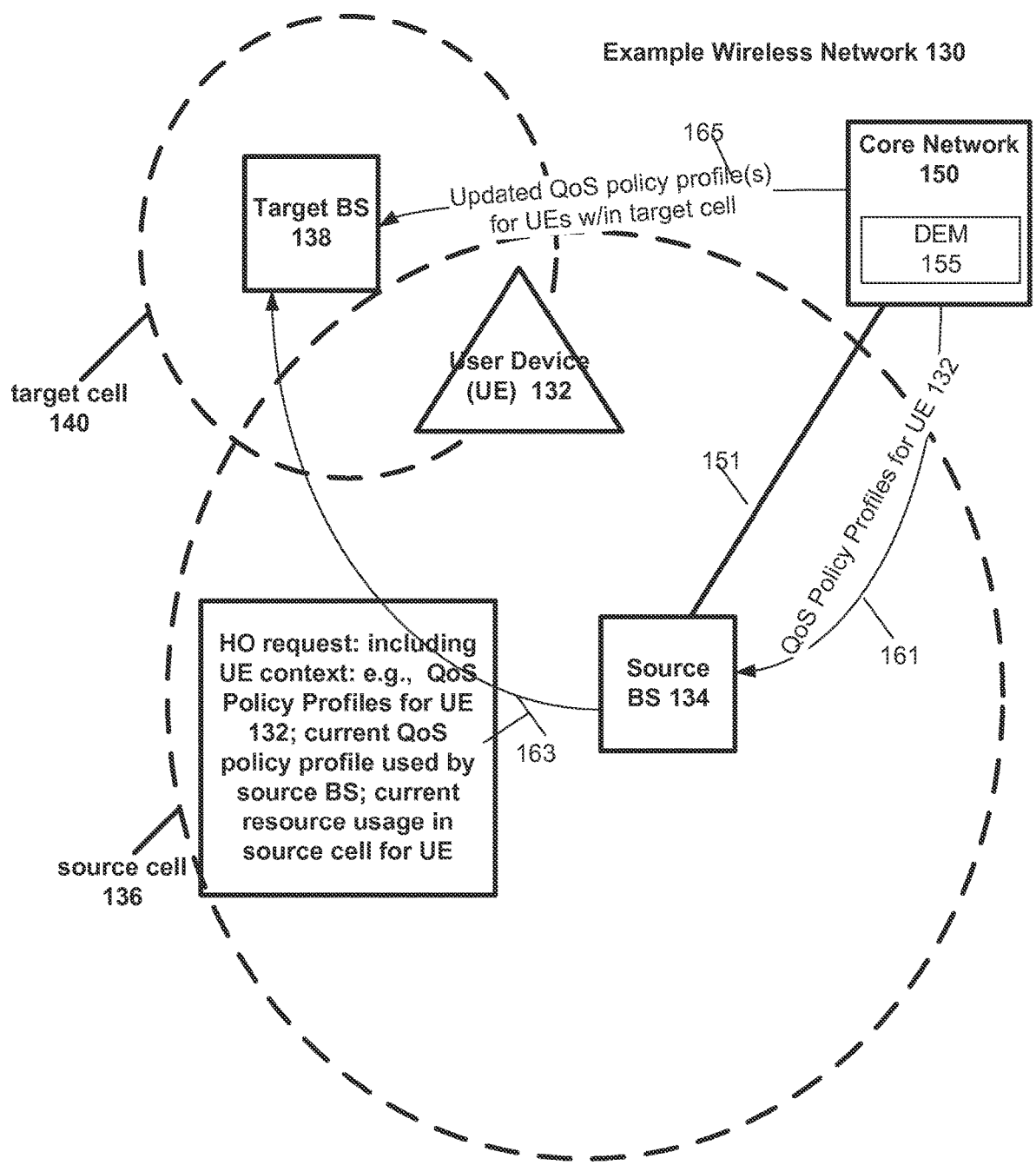
FIG. 1 is a diagram of a network according to an example implementation.

FIG. 1 is a block diagram of a wireless network 130 according to an example implementation. In the wireless network 130 of FIG. 1, a handover (or cell change procedure) may be performed for a user device 132, e.g., from a source cell 136 to a target cell 140, as an example. In an example implementation, a network node may include (or may be) a user device or UE, and/or a base station (BS) or evolved Node Bs (eNBs).

Referring to FIG. 1, a base station (BS) 134 may provide wireless services within cell 136, while BS 138 may provide wireless services within cell 140. According to an example implementation, user device 132, which may also be referred to as a user equipment (UE), may be initially connected to (and in communication with) source BS 134, via source cell 136. In an example implementation, e.g., based on one or more measurement reports received by source BS 134 from user device 132, a handover (or cell change procedure) may be performed for user device 132 to handover user device 132 from source cell 136/source BS 134 to target cell 140/target BS 138, for example. Thus, with reference to FIG. 1, in an illustrative example implementation, user device 132 may initially receive wireless services via source BS 134/source cell 136, and then after a handover, the user device 132 may receive wireless services via target BS 138/target cell 140. In some cases, at least part of the functionalities of a base station or (e)Node B (eNB) may be also be carried out by any node, server or host which may be operably coupled to a transceiver, such as a remote radio head.

BS 134 is also connected to a core network 150 via a S1 (BS-core network) interface 151. BS 138 may also be connected to core network 150. BS 138 may be connected via an X2 (or a BS-BS) interface (not shown) to BS 134. In this illustrative example, only two BSs/cells are shown, and only one user device/UE is shown, but any number of cells, base stations and user devices may be provided.

According to an example implementation, a user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an illustrative example), the core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

According to an example implementation, the core network 150, such as a dynamic experience management system (DEM) 155, or other experience management entity at the core network 150, may determine and then send one or more quality of service (QoS) policy profiles to source BS 134 for user device 132, as shown via line 161 in FIG. 1. For example, a QoS policy profile may indicate a QoS policy for providing wireless service for the user device 132. A QoS policy profile may include, for example, values for one or more QoS parameters for the user device, such as, for example, a minimum bit rate, a maximum latency, a packet drop policy, or other QoS parameters for the user device. For example, DEM 155 may receive a service subscription level (e.g., regular service, or premium service) for one or more user devices. DEM 155 may also receive, from one or more base stations/cells and/or for one or more user devices: a cell congestion/load level for a cell(s), packet delay, numbers of packet retransmissions, dropped connections, amount or percentage of occupied radio resources (or amount or percentage of available radio resources) within one or more cells, and/or other factors. According to an example implementation, a radio resource may include time frequency resources, such as physical resource blocks, one or more OFDM symbols, etc., which may be allocated to a user device for uplink or downlink transmission, for example. DEM 155 may update QoS policy profiles for one or more user devices based on various factors or criteria, e.g., in order to allocate network resources and provide a desired service quality to one or more user devices, e.g., which may include providing a higher (or minimum) service quality (higher QoS) to user devices having a premium service subscription, for example, or to provide a minimum service quality to user devices of specific categories, (e.g., such as emergency user devices, such as for fire, police, rescue personnel users/user devices).

Also, from time to time, or as network/cell conditions (e.g., congestion) or subscriber service levels change, as examples, the DEM 155 may send updated QoS policy profiles for a user device to a serving BS. For example, during a heavy cell load condition/cell congestion at a cell, e.g., where the cell is serving many user devices and/or where many/most of the radio resources of the cell may be occupied (allocated to user devices), the DEM 155 may receive cell status information (e.g., cell congestion information, radio resource availability information within a cell, numbers of served user devices by a cell, and other factors/data that may indicate cell congestion or very few/limited radio resources are available), and may adjust or update one or more QoS policy profiles for one or more user devices within the cell. For example, during a period of cell congestion/high radio resource usage, DEM 155 may adjust/update a QoS policy profile (e.g., increase a latency, and/or decrease a minimum bit rate) of a first user device having a normal service subscription level to reduce radio resources and/or service quality provided to such normal service subscription user device, and may adjust/update a QoS policy profile (e.g., decrease a latency, and/or increase a bit rate) of a second user device having a premium service subscription level, e.g., to ensure (or increase the likelihood) that the second user device will continue receiving a service quality/QoS that has been purchased by the second user device, for example. After the cell congestion has decreased, the DEM (based on congestion or cell resource usage/availability reports from one or more cells) may then re-adjust the QoS policy profiles back to an initial QoS policy profile, for example.

According to an example implementation, source BS 134 may receive a plurality of QoS policy profiles for each user device (such as user device 132) connected to source cell 138/source BS 134. According to an example implementation, each QoS policy profile: 1) may be associated with a different radio resource availability (or cell congestion) status, and 2) may indicate values for one or more QoS parameters (e g, minimum bit rate, maximum latency, packet drop policy, For example, source BS 134/source cell 138 may receive two QoS policy profiles for user device 132, including (by way of illustrative example):

TABLE 1

Example radio resource availability status and QoS parameters for two example QoS policy profiles for a user device 132.

| | Radio Resource Availability (or congestion) status | Min. Bit Rate | Max. Latency |
| --- | --- | --- | --- |
| QoS policy profile 1 | ≥40% available | A | B |
| QoS policy profile 2 | <40% available | C | D |

Table 1 illustrates two example QoS policy profiles for user device 132. For example, QoS policy profile 1 (e.g., an uncongested cell QoS policy profile) may be associated with, e.g., to be used for, a radio resource availability status of >40% of the radio resources in the cell are available (not occupied), as an example. QoS policy profile 2 (e.g., a congested cell QoS policy profile) may be associated with, e.g., to be used for, a radio resource availability status of <40% of the radio resources in the cell are available (not occupied), for example. While only two QoS policy profiles are shown in Table 1, any number of QoS policy profiles may be used. The radio resource availability status's or thresholds used for QoS policy profiles 1 and 2 (e.g., 40%) are merely examples, and any congestion or radio resource availability thresholds or status may be used for each QoS policy profile.

Also, according to one example implementation, the radio resource availability status for each QoS policy profile may be mandatory/required (e.g., BS must select/use the QoS policy profile that matches the indicated cell congestion/radio resource availability for the cell). According to another example implementation, the cell congestion/radio resource availability for each QoS profile may be merely a suggestion for selecting an appropriate QoS policy profile for a user device, e.g., based on the radio resource availability at a BS/cell. Such a required/optional feature may, for example, be configured via control signal provided from DEM 155, for example.

According to an example implementation, based on receipt from DEM 155 of the QoS policy profiles, source BS 134/source cell 136 and/or target BS 138/target cell 140 may autonomously (e.g., without requiring the BS 134 to obtain authorization from DEM 155) vary the service quality (or QoS) provided to the user device 132 within a range identified by the plurality of QoS policy profiles for the user device. Thus, a plurality of (two or more) QoS policy profiles may identify an (acceptable) QoS policy range for the user device 132 (e.g., as instructed/indicated by the DEM 155/core network 150), where any serving BS/cell (currently serving/connected to user device 132), such as either source cell 136 or target cell 140, may vary the service quality provided to the user device 132 among the plurality of QoS policy profiles, e.g., depending on the radio resource availability status/cell congestion status of the serving cell, for example. For example, based on the receipt of the QoS policy profiles for user device 132, the source BS 134 may autonomously vary the service quality within the acceptable QoS policy range by selecting among the QoS policy profiles, e.g., based on cell congestion or radio resource availability status.

By autonomously (without waiting for/or needing to obtain explicit permission from DEM 155 to select a different QoS policy profile) varying the service quality, this means that, for example, the serving BS may vary the service quality and/or select a different QoS policy profile for user device 132 (within the acceptable QoS policy range defined by the set of QoS policy profiles received from DEM 155 for the user device 132), without requiring the serving BS to request/obtain authorization from or otherwise communicate with the core network 150/DEM 155, for example.

Thus, for example, receiving the plurality of QoS policy profiles for a user device from DEM 155 may come with (e.g., explicit or implied) authorization to vary or select one (or a different one) of the QoS policy profiles to provide service to the user device, e.g., based on the radio resource availability and/or cell congestion (or other criteria or factors) within the serving cell, for example. This approach, e.g., allowing autonomous selection (by a serving BS) of a QoS policy profile within a group of policy profiles or within an acceptable QoS policy range may allow the DEM 155 to generally control QoS policies for each user device, while allowing a serving BS to quickly respond to changes in cell congestion/radio resource availability while continuing to provide service to the user device, without requiring the serving BS to communicate with the DEM 155/core network 150 before selecting a different QoS policy profile in response to a different/changed radio resource availability or cell congestion. Also, according to an example implementation, after varying the service quality, e.g., by selecting a different QoS policy profile (than what was used before) to use to provide service to a user device, the serving BS may send a message to DEM 155 to identify the QoS policy profile that has now been selected to provide service to the user device.

According to an example implementation, the use of a flexible QoS policy range (based on a plurality/group of QoS policy profiles for a user device) may advantageously be used when performing a handover (or cell change procedure) of a user device 132 from a source cell 136 to a target cell 140, for example. For example, as shown in FIG. 1 at line 163, as part of a handover preparation, such as provided in a handover request, the source BS 134 may send a UE (or user device) context to the target BS 138/target cell 140. For example, a handover request sent from the source BS 134 to the target BS 138 may include a UE context, e.g., including information identifying a plurality of (or group of) QoS policy profiles for the user device. The UE context may also include additional information, such as, for example, an indication of a current QoS policy profile that is currently used by the source BS 134/source cell 136 to provide service to the user device 132, and/or an indication of a current resource usage of the user device 132 in the source cell 136 (e.g., the amount or percent of radio resources in the source cell 136 that are used by or allocated to the user device 132 to provide service to the user device 132). The user device/UE context may include additional information.

Based on the UE/user device context received via the handover request (or via other message), the target BS 138/target cell 140 may determine a radio resource availability status (e.g., a percent of radio resources that are available) at the target BS 138/target cell 140. If sufficient resources are available to service the user device, the target BS 138/target cell 140 may then select one of the plurality of QoS policy profiles for the user device 132 to provide service to the user device 132, e.g., based on the radio resource availability status of the target cell and the plurality of QoS policy profiles for the user device. For example, if radio resource availability for the target BS 138/target cell 140 is at 28%, then target BS 138 may select QoS policy profile 2 (Table 1). According to an example implementation, the QoS policy profile selected by the target BS 138/target cell 140 may be the same or may be different from the current QoS policy profile that is/was used by the source BS 134/source cell 136 to provide service to the user device 132, e.g., because the cell congestion or radio resource availability status may be different at the target BS 138/target cell 140 as compared to the source BS 134/source cell 136.

According to an example implementation, if the target BS 138/target cell 140 has sufficient radio resources to service the user device 132, the target BS 138 may send a handover confirmation to the source BS 134 confirming a handover to the target BS 138/target cell 140. If sufficient resources are not available at the target BS 138/target cell 140 to meet at least the lowest QoS policy profile for the user device 132, then the target BS 138/target cell 140 may send a handover rejection message to the source BS 134/source cell 136. The handover confirmation may also indicate the QoS policy profile selected by the target BS 138 to be used by the target BS 138/target cell 140 to provide service to the user device 132 in target cell 140 after handover. For example, the selected QoS policy profile selected for use by the target cell 140 may be the same as the QoS policy profile used by source BS 134/source cell 136, may be an upgrade (e.g., providing a higher QoS/service quality such as based on less cell congestion/more availability of radio resources at the target BS/cell as compared to source BS/cell), or may be a downgrade (e.g., providing a lower QoS/service quality such as based on a greater cell congestion/less availability of radio resources at the target BS/cell) as compared to the service quality provided by the source BS 134/source cell 136. Thus, according to an example implementation, so long as the target BS 138/target cell 140 selects a service quality to be provided to user device 132 that is within the acceptable QoS policy range (e.g., by target BS 138/target cell 140 selecting one of the plurality of QoS policy profiles for the user device 132), then the target BS 138/target cell 140 may accept the handover of the user device 132. Thus, target BS 138 may select a QoS policy profile for user device 132, e.g., based on cell congestion or radio resource availability at target BS 138/target cell 140, that is different from the QoS policy profile currently used by source cell 136, without requiring target BS 138/target cell 140 or the source BS 134/source cell 136 to communicate with or obtain permission/authorization from core network 150/DEM 155 to use/select a different QoS policy profile for the user device 132 (e.g., so long as a service quality is provided that is within the acceptable QoS policy range, as defined by the set of QoS policy profiles). After a handover is performed for user device 132 from source BS 134/source cell 136 to target BS 138/target cell 140, the handover of user device 132 may be reported to core network 150/DEM 155. Also, core network 150/DEM 155 may send target BS 138/target cell 140 one or more updated QoS policy profiles for user device 132, as shown by line 165 in FIG. 1.

In one example implementation, a QoS policy profile (including the entire set of QoS parameter values for such QoS policy profile) may be selected and used by a BS/cell to serve a user device based on cell congestion or radio resource availability. In another example implementation, a QoS policy range is provided by the group of QoS policy profiles and a parameter value for each QoS parameter may be selected by a serving BS/cell between a maximum and minimum parameter value for each QoS parameter, as such parameter range is defined by the group of QoS policy profiles.

Figure 2:
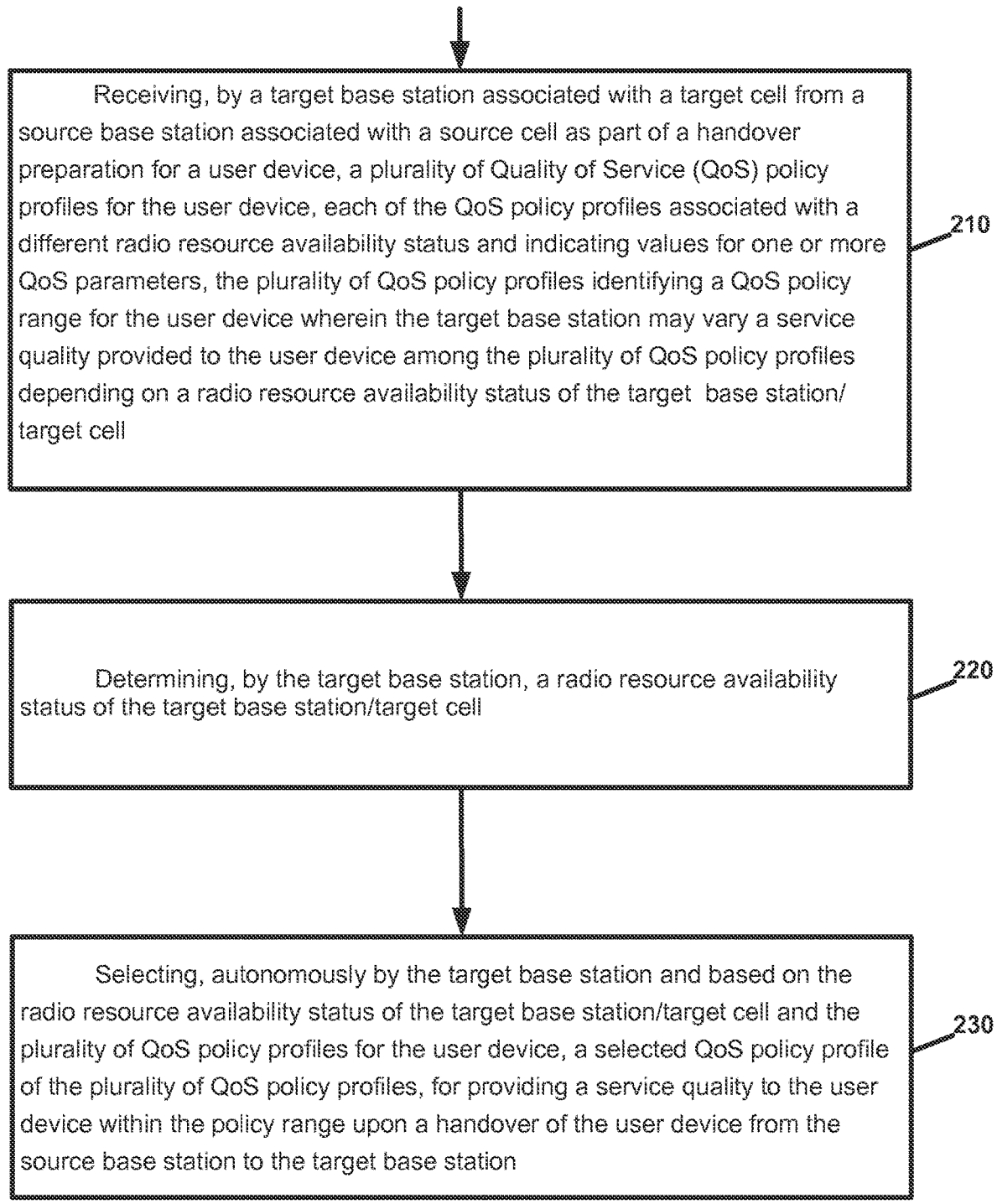
FIG. 2 is a flow chart illustrating operation of a base station according to an example implementation.

FIG. 2 is a flow chart illustrating operation of a target base station according to an example implementation. Operation 210 may include receiving, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell. Operation 220 may include determining, by the target base station, a radio resource availability status of the target base station/target cell. And, operation 230 may include selecting, autonomously, by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to an example implementation of the method of FIG. 2, the receiving, by the target base, a plurality of Quality of Service (QoS) policy profiles for the user device may include: receiving, by the target base station from the source base station, a handover request including the plurality of Quality of Service (QoS) policy profiles for the user device; and the method of FIG. 2 may further include: sending, by the target base station to the source base station, a handover confirmation including an indication of the selected QoS policy profile to be used by the target base station for providing a service quality to the user device.

According to an example implementation of the method of FIG. 2, the plurality of QoS policy profiles may include at least: a first QoS policy profile to be used when a cell/base station has a first radio resource availability status; and a second QoS policy profile to be used when a cell/base station has a second radio resource availability status. According to an example implementation of the method of FIG. 2, the determining, by the target base station, a radio resource availability status of the target base station/target cell may include determining the radio resource availability status of the target base station/target cell as either the first radio resource availability status or the second radio resource availability status; and wherein the selecting comprises selecting, autonomously by the target base station, either the first QoS policy profile or the second QoS policy profile based on the radio resource availability status of the target base station/target cell.

According to an example implementation of the method of FIG. 2, the method may further include receiving, by the target base station from the source base station, an indication of a current resource usage by the source base station/source cell to provide service to the user device.

According to an example implementation of the method of FIG. 2, the method may further include receiving, by the target base station from the source base station, an indication of a current QoS policy profile of the plurality of QoS policy profiles that are used by the source base station to provide service to the user device before a handover of the user device from the source base station to the target base station.

According to an example implementation of the method of FIG. 2, the selecting, autonomously by the target base station, the selected QoS policy profile of the plurality of the QoS policy profiles may include at least one of: selecting, by the target base station, a selected QoS policy profile to be used by the target base station, where the selected QoS policy profile is an upgrade or requires a higher QoS as compared to the current QoS policy profile that is used by the source base station; and selecting, by the target base station, a selected QoS policy profile to be used by the target base station, where the selected QoS policy profile is a downgrade or requires or allows a lower QoS as compared to the current QoS policy profile that is used by the source base station.

According to an example implementation of the method of FIG. 2, the method may further include sending, by the target base station to an experience management entity of a core network, an indication of the selected QoS policy profile to be used by the target base station for providing a service quality to the user device.

According to an example implementation, an apparatus may include means (502A/502B, 504, FIG. 5; 210) for receiving, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; means (502A/502B, 504, FIG. 5; 220) for determining, by the target base station, a radio resource availability status of the target base station/target cell; and, means (502A/502B, 504, FIG. 5; 230) for selecting, autonomously, by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station to the target base station.

According to an example implementation of the apparatus, the means for receiving, by the target base, a plurality of Quality of Service (QoS) policy profiles for the user device may include: means (502A/502B, 504, FIG. 5) for receiving, by the target base station from the source base station, a handover request including the plurality of Quality of Service (QoS) policy profiles for the user device; and the apparatus may further include: means (502A/502B, 504, FIG. 5) for sending, by the target base station to the source base station, a handover confirmation including an indication of the selected QoS policy profile to be used by the target base station for providing a service quality to the user device.

According to an example implementation of the apparatus, the plurality of QoS policy profiles may include at least: a first QoS policy profile to be used when a cell/base station has a first radio resource availability status; and a second QoS policy profile to be used when a cell/base station has a second radio resource availability status. According to an example implementation of the apparatus, the means for determining, by the target base station, a radio resource availability status of the target base station/target cell may include means (502A/502B, 504, FIG. 5) for determining the radio resource availability status of the target base station/target cell as either the first radio resource availability status or the second radio resource availability status; and wherein the means for selecting may include means (502A/502B, 504, FIG. 5) for selecting, autonomously by the target base station, either the first QoS policy profile or the second QoS policy profile based on the radio resource availability status of the target base station/target cell.

According to an example implementation of the apparatus, the apparatus may further include means (502A/502B, 504, FIG. 5) for receiving, by the target base station from the source base station, an indication of a current resource usage by the source base station/source cell to provide service to the user device.

According to an example implementation of the apparatus, the apparatus may further include means (502A/502B, 504, FIG. 5) for receiving, by the target base station from the source base station, an indication of a current QoS policy profile of the plurality of QoS policy profiles that are used by the source base station to provide service to the user device before a handover of the user device from the source base station to the target base station.

According to an example implementation of the apparatus, the means for selecting, autonomously by the target base station, the selected QoS policy profile of the plurality of the QoS policy profiles may include at least one of: means (502A/502B, 504, FIG. 5) for selecting, by the target base station, a selected QoS policy profile to be used by the target base station, where the selected QoS policy profile is an upgrade or requires a higher QoS as compared to the current QoS policy profile that is used by the source base station; and means (502A/502B, 504, FIG. 5) for selecting, by the target base station, a selected QoS policy profile to be used by the target base station, where the selected QoS policy profile is a downgrade or requires or allows a lower QoS as compared to the current QoS policy profile that is used by the source base station.

According to an example implementation of the apparatus, the apparatus may further include means (502A/502B, 504, FIG. 5) for sending, by the target base station to an experience management entity of a core network, an indication of the selected QoS policy profile to be used by the target base station for providing a service quality to the user device.

According to an example implementation, an apparatus may include means for performing a method of any method operation described or illustrated herein.

According to an example implementation, an apparatus may include at least one processor, and at least one non-transitory computer-readable storage medium comprising instructions that, when executed by the at least one processor, are configured to cause the apparatus to perform any method operation(s) described or illustrated herein.

According to an example implementation, a computer program product for a computer may include software code portions for performing any of the method operation(s) described or illustrated herein when the product is run on the computer.

According to an example implementation, an apparatus may include at least one processor and at least one memory including a computer program code, wherein the at least one memory and the computer program code are configured to, with the at least one processor, cause the apparatus at least to: receive, by a target base station associated with a target cell from a source base station associated with a source cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein the target base station may vary a service quality provided to the user device among the plurality of QoS policy profiles depending on a radio resource availability status of the target base station/target cell; determine, by the target base station, a radio resource availability status of the target base station/target cell; and select, autonomously by the target base station and based on the radio resource availability status of the target base station/target cell and the plurality of QoS policy profiles for the user device, a selected QoS policy profile of the plurality of QoS policy profiles, for providing a service quality to the user device within the policy range upon a handover of the user device from the source base station/source cell to the target base station/target cell.

Figure 3:
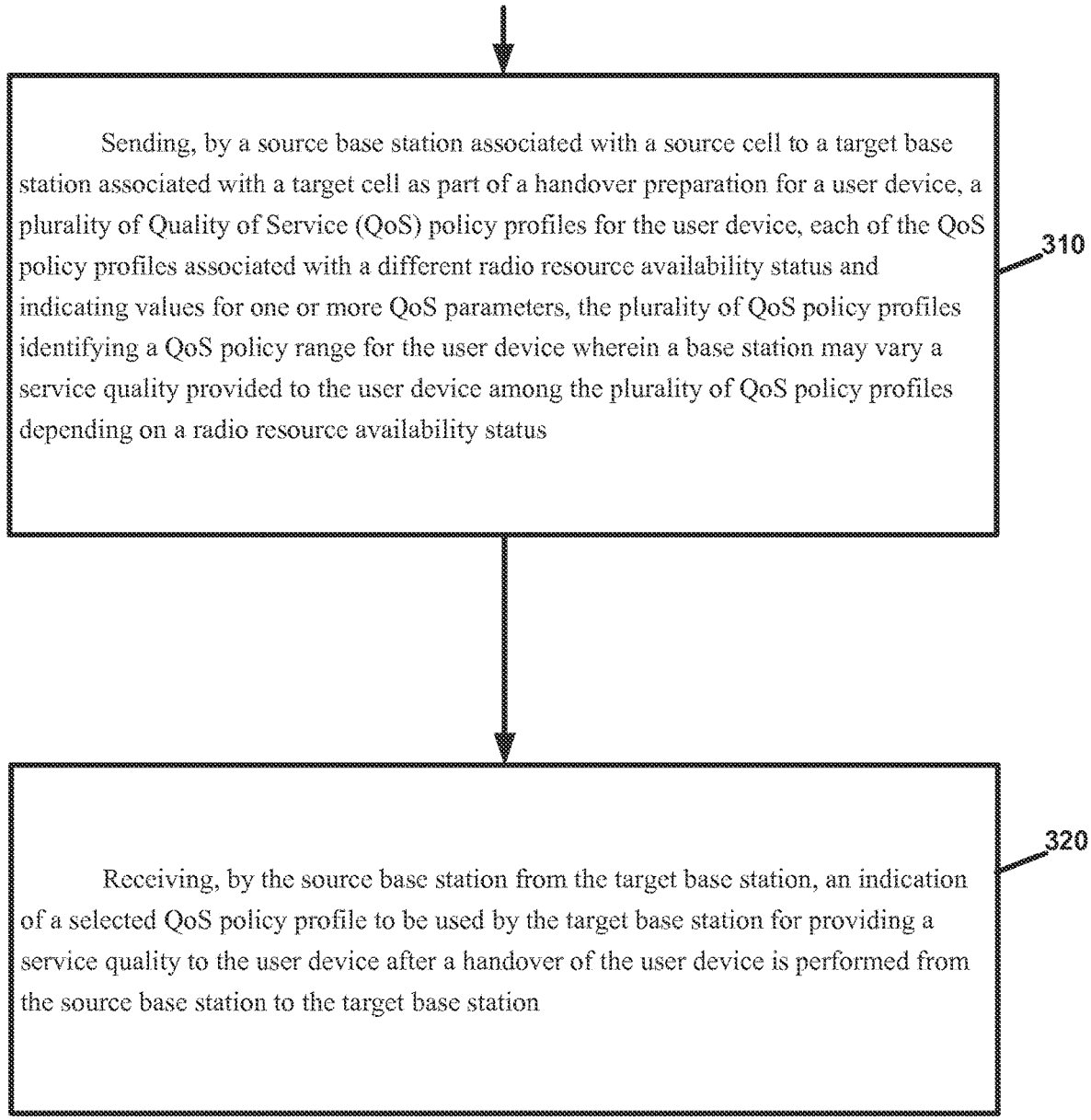
FIG. 3 is a flow chart illustrating operation of a base station according to another example implementation.

FIG. 3 is a flow chart illustrating operation of a source base station according to an example implementation. Operation 310 may include sending, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status. And, operation 320 may include receiving, by the source base station from the target base station, an indication of a selected QoS policy profile to be used by the target base station for providing a service quality to the user device after a handover of the user device is performed from the source base station/source cell to the target base station/target cell.

According to an example implementation of the method of FIG. 3, the sending may include sending, by the source base station to the target base station, a handover request, including at least the plurality of Quality of Service (QoS) policy profiles for the user device; and wherein the receiving may include receiving, by the source base station from the target base station, a handover confirmation that confirms handover of the user device and indicates a selected QoS policy profile to be used by the target base station for providing a service quality to the user device after a handover of the user device is performed from the source base station/source cell to the target base station/target cell.

According to an example implementation of the method of FIG. 3, the handover request may further include: an indication of a current resource usage in the source base station/source cell to provide service to the user device before handover of the user device from the source base station/source cell to the target base station/target cell; and an indication of a current QoS policy profile of the plurality of QoS policy profiles that is used by the source base station to provide service to the user device before a handover of the user device from the source base station/source cell to the target base station/target cell.

According to an example implementation of the method of FIG. 3, the method may further include determining, by the source base station, a current QoS policy profile of the plurality of QoS policy profiles that is used by the source base station to provide service to the user device before a handover of the user device from the source base station/source cell to the target base station/target cell; determining a resource gap based on one or more differences between the selected QoS policy profile to be used by the target base station for providing a service quality to the user device and the current QoS policy profile that is used by the source base station to provide service to the user device before a handover of the user device; and sending, by the source base station to an experience management entity at a core network, an indication of the resource gap.

According to an example implementation of the method of FIG. 3, the plurality of QoS policy profiles may include at least: a first QoS policy profile to be for the user device used when a cell/base station has radio resource availability of greater than a first threshold; and a second QoS policy profile to be used for the user device when a cell/base station has radio resource availability that is less than or equal to the first threshold.

According to an example implementation, an apparatus includes means (502A/502B, 504, FIG. 5; 310) for sending, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and, means (502A/502B, 504, FIG. 5; 320) for receiving, by the source base station from the target base station, an indication of a selected QoS policy profile to be used by the target base station for providing a service quality to the user device after a handover of the user device is performed from the source base station/source cell to the target base station/target cell.

According to an example implementation of the apparatus, the means for sending may include means (502A/502B, 504, FIG. 5) for sending, by the source base station to the target base station, a handover request, including at least the plurality of Quality of Service (QoS) policy profiles for the user device; and wherein the means for receiving may include means (502A/502B, 504, FIG. 5) for receiving, by the source base station from the target base station, a handover confirmation that confirms handover of the user device and indicates a selected QoS policy profile to be used by the target base station for providing a service quality to the user device after a handover of the user device is performed from the source base station/source cell to the target base station/target cell.

According to an example implementation of the apparatus, the handover request may further include: an indication of a current resource usage in the source base station/source cell to provide service to the user device before handover of the user device from the source base station/source cell to the target base station/target cell; and an indication of a current QoS policy profile of the plurality of QoS policy profiles that is used by the source base station to provide service to the user device before a handover of the user device from the source base station/source cell to the target base station/target cell.

According to an example implementation of apparatus, the apparatus may further include means (502A/502B, 504, FIG. 5) for determining, by the source base station, a current QoS policy profile of the plurality of QoS policy profiles that is used by the source base station to provide service to the user device before a handover of the user device from the source base station/source cell to the target base station/target cell; means (502A/502B, 504, FIG. 5) for determining a resource gap based on one or more differences between the selected QoS policy profile to be used by the target base station for providing a service quality to the user device and the current QoS policy profile that is used by the source base station to provide service to the user device before a handover of the user device; and means (502A/502B, 504, FIG. 5) for sending, by the source base station to an experience management entity at a core network, an indication of the resource gap.

According to an example implementation of the apparatus, the plurality of QoS policy profiles may include at least: a first QoS policy profile to be for the user device used when a cell/base station has radio resource availability of greater than a first threshold; and a second QoS policy profile to be used for the user device when a cell/base station has radio resource availability that is less than or equal to the first threshold.

According to an example implementation, an apparatus may include at least one processor and at least one memory including a computer program code, wherein the at least one memory and the computer program code are configured to, with the at least one processor, cause the apparatus at least to: send, by a source base station associated with a source cell to a target base station associated with a target cell as part of a handover preparation for a user device, a plurality of Quality of Service (QoS) policy profiles for the user device, each of the QoS policy profiles associated with a different radio resource availability status and indicating values for one or more QoS parameters, the plurality of QoS policy profiles identifying a QoS policy range for the user device wherein a base station may vary a service quality provided to the user device among the plurality of QoS policy profiles depending on a radio resource availability status; and receive, by the source base station from the target base station, an indication of a selected QoS policy profile to be used by the target base station for providing a service quality to the user device after a handover of the user device is performed from the source base station/source cell to the target base station/target cell.

Figure 4:
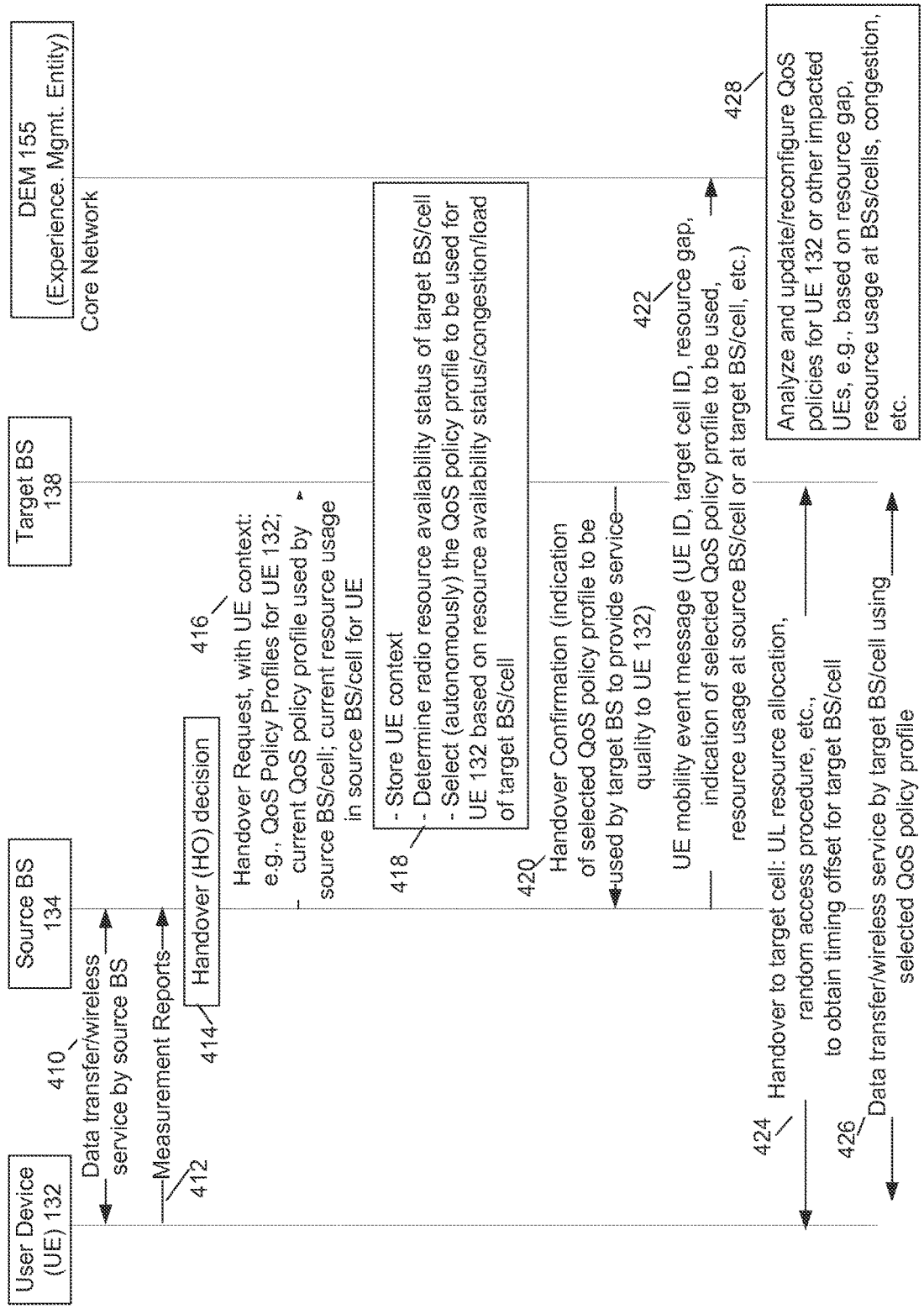
FIG. 4 is a diagram illustrating operation of a network according to an example implementation.

FIG. 4 is a diagram illustrating operation of a wireless network according to an example implementation. In FIG. 4, several entities are shown in communication, including user device 132, source BS 134, target BS 138, and DEM 155 (experience management entity). Initially, user device 132 may establish a connection with source BS 134. At 410, data transfer (receiving data via downlink radio resources, and transmitting data via uplink resources to source BS 134) may be provided as part of the wireless service provided to user device 132 by source BS 134. At 412, the user device may measure signals (e.g., received signal strength or signal quality) received from one or more base stations, and may send a measurement report(s) to source BS 134, which may indicate (e.g., based on received signal quality or received signal strength) a handover to target BS 138/target cell 140. At 414, source BS 134 may make a handover decision, e.g., make a decision to perform handover to target BS 138/target cell 140 for user device 132 based on the measurement report(s).

Source BS 134 and target BS 138 may exchange one or more messages as part of handover preparation, such as messages at 416 and 420, for example. For example, at 416, source BS 134 may send a handover request to target BS 138. For example, as part of the handover request at 416, or as part of a separate message, the source BS 134 may send a UE (or user device) context for user device 132 to the target BS 138/target cell 140. For example, a handover request may be sent from the source BS 134 to the target BS 138 that may include a UE context, e.g., including information identifying/indicating a plurality of (or group of) QoS policy profiles for the user device 132. For example, the UE/user device context may indicate/identify two QoS policy profiles (or may identify QoS parameters values for each policy profile), such as, for example: a first QoS policy profile (e.g., a non-congested policy profile to use in non-congested cell conditions/or where more than a threshold amount of radio resources are available), and a second QoS policy profile (e.g., a congested policy profile to use in non-congested cell conditions/or where less than a threshold amount of radio resources are available). The UE/user device context, e.g., sent in the handover request at 416, may also include additional information, such as, for example, an indication of a current QoS policy profile (of the plurality/group of QoS policy profiles) that is currently used by the source BS 134/source cell 136 to provide service to the user device 132, and/or an indication of a current resource usage by the user device 132 in the source BS 134/source cell 136 (e.g., indicating an amount or percentage of radio resources in the source cell 136 that are used by or allocated to the user device 132 to provide service to the user device 132). The user device/UE context may include additional information.

At 418, in response to the handover request at 416, the target BS 138/target cell 140 may store the UE context for user device 132. The target BS 138/target cell 140 may perform cell admission control for the user device 132 to determine if target BS 138/target cell 140 has sufficient resources to accommodate a handover of user device 132 from source cell 136 to target cell 140. For example, the target BS 138/target cell 140 may determine a radio resource availability status (e.g., a percentage of radio resources that are available) at the target BS 138/target cell 140, and then may compare these available resources (or a cell congestion status) to the plurality of QoS policy profiles for the user device, e.g., to determine if the target BS 138/target cell 140 has sufficient resources to provide service to user device 132 that is within the acceptable QoS policy range for user device 132.

At 418, if the target BS 138/target cell 140 does not have sufficient resources to provide a service quality/QoS to user device 132 within the acceptable QoS policy range (e.g., as indicated by the plurality/group of QoS policy profiles for user device 132), then target BS 138/target cell 140 may send a handover rejection message (not shown) to source BS 134/source cell 136. However, according to an example implementation, the use of a flexible QoS policy range, e.g., based on a plurality of QoS policy profiles for varying cell congestion/resource availability conditions, may decrease the likelihood that the target BS 138/target cell 140 will be forced to reject a handover request, even in periods of cell congestion/low resource availability.

In addition, for example, target BS 138/target cell 140 may accept the handover of user device 132 if target BS 138/target cell 140 has sufficient resources, e.g., to meet a service quality for user device 132 within an acceptable QoS policy range as defined by the plurality or group of QoS policy profiles for the user device 132. Thus, in one example implementation, target BS 138/target cell 140 may accept a handover of user device 132 if target BS 138/target cell 140 has sufficient resources to meet the lowest QoS policy profile (e.g., indicating a lowest minimum bit rate and/or a maximum latency that would be acceptable for user device 132, e.g., during high congestion periods or periods of low radio resource availability at a serving cell) within the acceptable QoS policy range indicated for user device 132.

After determining that sufficient resources are available at the target cell 140 to accept a handover of user device 132, the target BS 138/target cell 140 may then select one of the plurality of QoS policy profiles for the user device 132 to provide service to the user device 132, e.g., based on the radio resource availability status or cell congestion of the target cell 140 and the plurality of QoS policy profiles for the user device. For example, if radio resource availability for the target cell 140 is at 28%, then target BS 138 may select QoS policy profile 2 (Table 1). According to an example implementation, the QoS policy profile selected by the target BS 138/target cell 140 may the same or may be different from the current QoS policy profile that is/was used by the source BS 134/source cell 136 to provide service to the user device 132, e.g., because the cell congestion or radio resource availability status may be different at the target cell 140 as compared to the source cell 136. According to an example implementation, the target BS 138/target cell 140 may autonomously (e.g., without requiring communication with or permission from core network 150/DEM 155) select a QoS policy profile within the acceptable QoS policy range that is either: 1) the same service quality/same QoS policy profile, 2) is an upgrade (e.g., provides improved/increased service quality/QoS), or 3) is a downgrade (e.g., provides decreased service quality QoS) as compared to the current service quality/QoS policy profile used by the source BS 134/source cell 136 to provide service to the user device 132 before handover to target BS 138/target cell 140.

At 420 (FIG. 4), the target BS 138 may send a handover confirmation to the source BS 134 confirming a handover to the target cell. The handover confirmation may indicate the QoS policy profile selected by the target BS to be used by the target BS 138/target cell 140 to provide service to the user device 132 in target cell 140 after handover. For example, the selected QoS policy profile selected for use by the target cell 140 may be: 1) the same as the QoS policy profile used by source cell 136, 2) an upgrade (e.g., providing a higher QoS/service quality such as based on less cell congestion/more availability of radio resources at the target cell as compared to source cell), or 3) a downgrade (e.g., providing a lower QoS/service quality such as based on a greater cell congestion/less availability of radio resources at the target cell) as compared to the service quality provided by the source cell 136. Thus, according to an example implementation, so long as the target BS 138/target cell 140 selects a service quality to be provided to user device 132 that is within the acceptable QoS policy range (e.g., by target BS 138/target cell 140 selecting one of the plurality of QoS policy profiles for the user device 132), then the target BS/138/target cell 140 may accept the handover of the user device 132.

At 422, the source BS 134 may determine a resource gap (or gap in resources allocated to the user device 132), e.g., based on a difference between the service quality/QoS policy profile provide by source BS 134/source cell 136 as compared to the service quality/QoS policy profile provided by the target BS 138/target cell 140. The resource gap may be a positive resource gap, e.g., indicating a downgrade in service quality/QoS policy profile at the target BS 138/target cell as compared to the source BS/source cell, or a negative resource gap, e.g., indicating an upgrade in service quality/QoS policy profile at the target BS 138/target cell 140 as compared to the source BS 134/source cell 136. At 422, source BS 134 may send a mobility event message to the core network 150 or DEM 155 to report the resource gap at the target BS 138/target cell 140 for the user device 132. The mobility event message at 422 may include, for example, a UE ID to identify the user device 132, a target cell ID to identify target cell 140, and an indication of the resource gap. Other information may be included in the mobility event message, such as, for example, an indication of the service quality or selected QoS policy profile for use by the target BS 138/target cell 140 to provide service to the user device 132, the resource usage at the target cell or at the source cell to service the user device 132, and/or other information.

At 428, the DEM 155 may analyze the receive mobility message, e.g., indicating a resource gap and/or a different QoS policy profile used by target cell 140 to serve user device 132. DEM 155 may, for example, determine updated QoS policy profiles for one or more user devices. In this illustrative example, user device 132 may have a premium service subscription, while one or more other user devices in target cell 140 may be normal service subscription. For example, if a lowest QoS policy profile was selected by target BS 138 for user device 132 based on cell congestion/low availability of radio resources at target cell 140, DEM 155 may send a message to target BS 138 to adjust (e.g., decrease the service quality for) QoS policy profiles of one or more other user devices in cell 140 that are normal service subscription, e.g., so as to free up (or make available) additional radio resources (and decrease cell congestion in cell 140) for user device 132 which has a premium service subscription. Once the cell congestion decreases at cell 140, which may be reported to DEM 144 by target BS 138, then DEM 155 may return the QoS policy profiles for one or more user device to their original or previous values. This is merely one illustrative example, and DEM 155 may perform many other adjustments to various QoS policy profiles for user devices based on cell congestion, radio resource availability, service subscription levels, etc.

At 424, a handover for user device 132 may be performed or completed from source BS 134/source cell 136 to target BS 138/target cell 140. This operation of completing/performing handover may include, e.g., user device 132 perform a random access procedure with target BS/target cell 140 to obtain timing information or a timing advance offset to allow user device to communication with target BS 138/target cell 140, for example. At 428, a data transfer may be performed between cell 140 and user device 132 as part of the service provided by target BS 138/target cell 140 to user device 132.

According to an other example implementation, each BS may assign a VLAN ID or radio flow ID for each communication session between a serving BS and the user device 132. User device 132 may also be connected to multiple serving BSs/cells at a time. A handover or cell change operation may be performed based on measurement reports from the user device, for example.

Also, according to another example implementation, user device 132 and/or source BS 134 may initiate handover to multiple (possible) target BSs, and then may complete the handover to a best target BS that offers (or confirms or indicates) a highest service quality/QoS policy profile to be used to serve user device 132. Also, the mobility event management message (e.g., reporting a resource gap at target cell 140) may be received by DEM 155 prior to completing handover, and may be used by DEM 155/core network 150 to provide a dynamic QoE (quality of experience) manager at DEM 155 that allows DEM to analyze and reconfigure QoS policy profiles near-real time, e.g., for other impacted UEs within target cell 140, for example.

Figure 5:
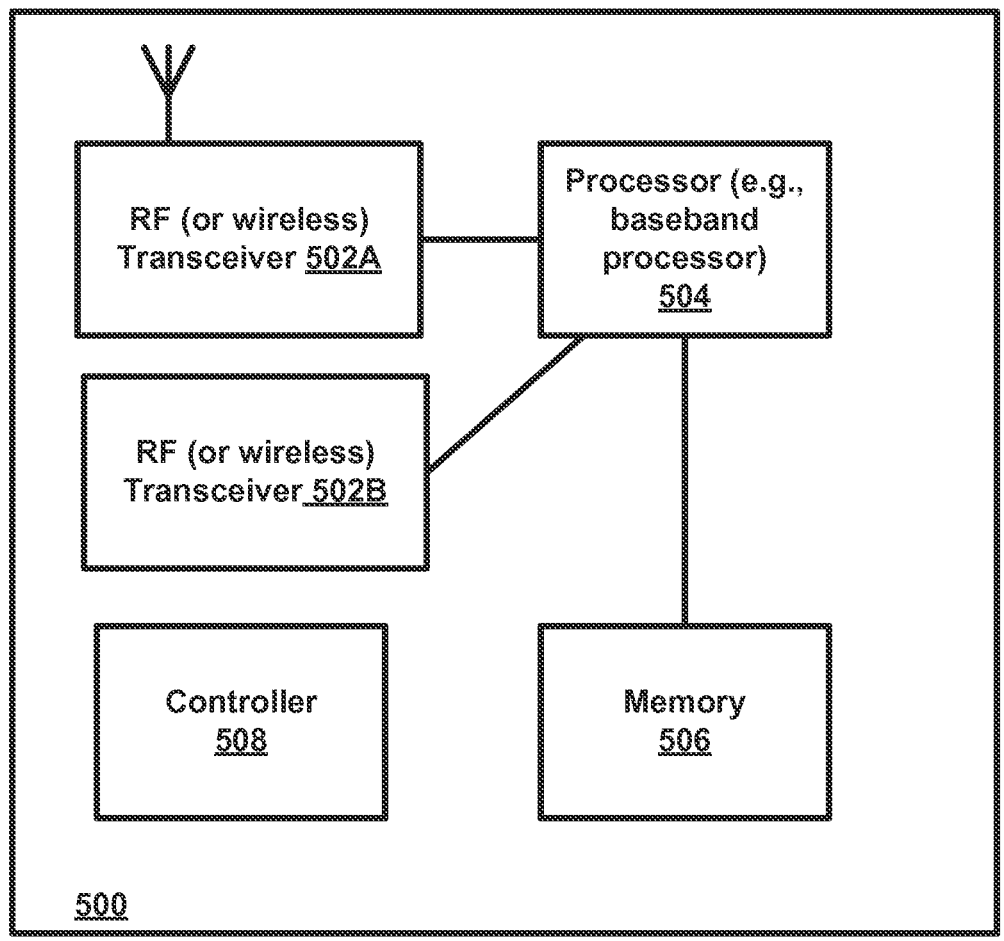
FIG. 5 is a block diagram of a network node or a wireless station (e.g., BS or user device) according to an example implementation.

FIG. 5 is a block diagram of a wireless station (e.g., BS or user device) 500 according to an example implementation. The wireless station 500 may include, for example, two RF (radio frequency) or wireless transceivers 502A, 502B, where each wireless transceiver includes a transmitter to transmit signals and a receiver to receive signals. The wireless station also includes a processor or control unit/entity (controller) 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

Similarly, DEM 155 may include a processor, memory, and one or more network interfaces, and may be provided within a core network, on a server, or provided as a cloud service.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a target base station associated with a target cell from a source base station associated with a source cell as part of a handover preparation for a user device, a plurality of Quality of Service (QoS) policy profiles at a time for the user device, each of the plurality of QoS policy profiles including a different radio resource availability status range and values for one or more associated QoS parameters, wherein the plurality of QoS policy profiles define a QoS policy range for the user device such that the target base station can change a service quality provided to the user device among the plurality of QoS policy profiles depending on a radio resource availability status of the target base station;
   determining, by the target base station, a radio resource availability status of the target base station; and
   selecting, autonomously by the target base station and based on the determined radio resource availability status of the target base station, a QoS policy profile of the plurality of QoS policy profiles for which the radio resource availability status range includes the determined radio resource availability status, for providing a service quality to the user device within the policy range upon a handover of the user device from the source base station to the target base station.

2. The method of claim 1 wherein the receiving, by the target base station, a plurality of Quality of Service (QoS) policy profiles for the user device comprises:
   receiving, by the target base station from the source base station, a handover request including the plurality of Quality of Service (QoS) policy profiles for the user device; and
   the method further comprising:
   sending, by the target base station to the source base station, a handover confirmation including an indication of the selected QoS policy profile to be used by the target base station for providing a service quality to the user device after handover.

3. The method of claim 1 wherein the plurality of QoS policy profiles comprises at least:
   a first QoS policy profile to be used when a base station has a first radio resource availability status; and
   a second QoS policy profile to be used when the base station has a second radio resource availability status.

4. The method of claim 3, wherein the determining, by the target base station, a radio resource availability status of the target base station comprises determining the radio resource availability status of the target base station as either the first radio resource availability status or the second radio resource availability status; and
   wherein the selecting comprises selecting, autonomously by the target base station, either the first QoS policy profile or the second QoS policy profile based on the radio resource availability status of the target base station.

5. The method of claim 1 and further comprising:
   receiving, by the target base station from the source base station, an indication of a current resource usage by the source base station to provide service to the user device.

6. The method of claim 1 and further comprising:
   receiving, by the target base station from the source base station, an indication of a current QoS policy profile of the plurality of QoS policy profiles that is used by the source base station to provide service to the user device before a handover of the user device from the source base station to the target base station.

7. The method of claim 6 wherein the selecting, autonomously by the target base station, the selected QoS policy profile of the plurality of the QoS policy profiles comprises at least one of:
   selecting, by the target base station, a selected QoS policy profile to be used by the target base station, where the selected QoS policy profile is an upgrade or requires a higher QoS as compared to the current QoS policy profile that is used by the source base station; and
   selecting, by the target base station, a selected QoS policy profile to be used by the target base station, where the selected QoS policy profile is a downgrade or requires or allows a lower QoS as compared to the current QoS policy profile that is used by the source base station.

8. The method of any of claim 1 and further comprising:
   sending, by the target base station to an experience management entity of a core network, an indication of the selected QoS policy profile to be used by the target base station for providing a service quality to the user device.

9. A computer program product, the computer program product being tangibly embodied on a non-transitory computer-readable storage medium and including instructions that, when executed by at least one processor, are configured to cause a target base station associated with a target cell to:
   receive, from a source base station associated with a source cell as part of a handover preparation for a user device, a plurality of Quality of Service (QoS) policy profiles at a time for the user device, each of the plurality of QoS policy profiles including a different radio resource availability status range and values for one or more associated QoS parameters, wherein the plurality of QoS policy profiles define a QoS policy range for the user device such that the target base station can change a service quality provided to the user device among the plurality of QoS policy profiles depending on a radio resource availability status of the target base station;

determine, by the target base station, a radio resource availability status of the target base station; and select, autonomously by the target base station and based on the determined radio resource availability status of the target base station, a QoS policy profile of the plurality of QoS policy profiles for which the radio resource availability status range includes the predetermined radio resource availability status, for providing a service quality to the user device within the policy range upon a handover of the user device from the source base station to the target base station.

10. A method comprising:

sending, by a source base station associated with a source cell to a target base station associated with a target cell as part of a handover preparation for a user device, a plurality of Quality of Service (QoS) policy profiles at a time for the user device, each of the plurality of QoS policy profiles including a different radio resource availability status range and values for one or more associated QoS parameters, wherein the plurality of QoS policy profiles define a QoS policy range for the user device such that the target base station varies a service quality provided to the user device among the plurality of QoS policy profiles depending on a radio resource availability status; and receiving, by the source base station from the target base station, an indication of a selected QoS policy profile to be used by the target base station for providing a service quality to the user device after a handover of the user device is performed from the source base station to the target base station.

11. The method of claim 10:

wherein the sending comprises sending, by the source base station to the target base station, a handover request, including at least the plurality of Quality of Service (QoS) policy profiles for the user device; and wherein the receiving comprises receiving, by the source base station from the target base station, a handover confirmation that confirms handover of the user device and indicates a selected QoS policy profile to be used by the target base station for providing a service quality to the user device after a handover of the user device is performed from the source base station to the target base station.

12. The method of claim 11 wherein the handover request further comprises:

an indication of a current resource usage in the source base station to provide service to the user device before handover of the user device from the source base station to the target base station; and an indication of a current QoS policy profile of the plurality of QoS policy profiles that is used by the source base station to provide service to the user device before a handover of the user device from the source base station to the target base station.

13. The method of claim 10 and further comprising:

determining, by the source base station, a current QoS policy profile of the plurality of QoS policy profiles that is used by the source base station to provide service to the user device before a handover of the user device from the source base station to the target base station;

determining a resource gap based on one or more differences between the selected QoS policy profile to be used by the target base station for providing a service quality to the user device and the current QoS policy profile that is used by the source base station to provide service to the user device before a handover of the user device; and sending, by the source base station to an experience management entity at a core network, an indication of the resource gap.

14. The method of claim 10 wherein the plurality of QoS policy profiles comprises at least:

a first QoS policy profile to be used for the user device when the target base station has radio resource availability that is greater than a first threshold; and a second QoS policy profile to be used for the user device when the target base station has radio resource availability that is less than or equal to the first threshold.

15. A computer program product, the computer program product being tangibly embodied on a non-transitory computer-readable storage medium and including instructions that, when executed by at least one processor, are configured to cause a source base station associated with a source cell to:

send, to a target base station associated with a target cell as part of a handover preparation for a user device, a plurality of Quality of Service (QoS) policy profiles at a time for the user device, each of the plurality of QoS policy profiles including a different radio resource availability status range and values for one or more associated QoS parameters, wherein the plurality of QoS policy profiles define a QoS policy range for the user device such that the target base station varies a service quality provided to the user device among the plurality of QoS policy profiles depending on a radio resource availability status; and receive, by the source base station from the target base station, an indication of a selected QoS policy profile to be used by the target base station for providing a service quality to the user device after a handover of the user device is performed from the source base station to the target base station.

16. An apparatus, comprising:

at least one processor and at least one memory including a computer program code, wherein the at least one memory and the computer program code are configured to, with the at least one processor, cause the apparatus at least to:

send, by a source base station associated with a source cell to a target base station associated with a target cell as part of a handover preparation for a user device, a plurality of Quality of Service (QoS) policy profiles at a time for the user device, each of the plurality of QoS policy profiles including a different radio resource availability status range and values for one or more associated QoS parameters, wherein the plurality of QoS policy profiles define a QoS policy range for the user device such that the target base station varies a service quality provided to the user device among the plurality of QoS policy profiles depending on a radio resource availability status; and receive, by the source base station from the target base station, an indication of a selected QoS policy profile to be used by the target base station for providing a service quality to the user device after a handover of the user device is performed from the source base station to the target base station.

* * * * *

UNITED STATES PATENT AND TRADEMARK OFFICE
CERTIFICATE OF CORRECTION

PATENT NO. : 11,026,133 B2  
APPLICATION NO. : 15/568433  
DATED : June 1, 2021  
INVENTOR(S) : Vesterinen et al.

Page 1 of 1

It is certified that error appears in the above-identified patent and that said Letters Patent is hereby corrected as shown below:

On the Title Page

Column 2, item (56), under "OTHER PUBLICATIONS", Line 1, delete "(Jan. 2014)" and insert -- (Dec. 2014) --, therefor.

In the Claims

In Column 22, Line 47, Claim 8, delete "of any of" and insert -- of --, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*